(12) United States Patent
Call et al.

(10) Patent No.: US 7,562,766 B2
(45) Date of Patent: Jul. 21, 2009

(54) CONVEYOR APPARATUS AND SYSTEM

(75) Inventors: Matthew J. Call, High Ridge, MO (US); Christopher J. Luber, Collinsville, IL (US)

(73) Assignee: Anheuser-Busch, Inc., St. Louis, MO (US)

( * ) Notice: Subject to any disclaimer, the term of this patent is extended or adjusted under 35 U.S.C. 154(b) by 23 days.

(21) Appl. No.: 11/772,434

(22) Filed: Jul. 2, 2007

(65) Prior Publication Data

US 2009/0008225 A1    Jan. 8, 2009

(51) Int. Cl.
*B65G 21/20* (2006.01)
*B65G 15/62* (2006.01)

(52) U.S. Cl. ........................................ 198/840; 198/841

(58) Field of Classification Search ................. 198/840, 198/841
See application file for complete search history.

(56) References Cited

U.S. PATENT DOCUMENTS

| | | | | |
|---|---|---|---|---|
| 2,996,870 | A * | 8/1961 | Fornes et al. ..................... 57/95 |
| 3,972,414 | A * | 8/1976 | Conrad ........................ 198/808 |
| 4,215,776 | A * | 8/1980 | Esler ........................... 198/823 |
| 4,724,953 | A * | 2/1988 | Winchester .............. 198/836.3 |
| 4,917,232 | A * | 4/1990 | Densmore ................... 198/830 |
| 5,762,178 | A * | 6/1998 | Tarlton ..................... 198/860.2 |
| 5,782,340 | A * | 7/1998 | Dolan ........................ 198/841 |
| 6,269,939 | B1 | 8/2001 | Lapeyre et al. |
| 6,640,966 | B2 | 11/2003 | Reatti |
| 6,964,333 | B2 * | 11/2005 | Ledingham ................. 198/841 |
| 7,000,759 | B1 | 2/2006 | Jones |
| 7,128,201 | B2 | 10/2006 | Jones |
| 2006/0237292 | A1 | 10/2006 | Ryan |

* cited by examiner

*Primary Examiner*—Mark A Deuble
(74) *Attorney, Agent, or Firm*—Storm LLP; Paul V. Storm; Mark D. Perdue

(57) ABSTRACT

Typical roller conveyors suffer from excess noise and frequent maintenance due to worn rollers and roller bearings. Continuous loop belt conveyors solve some of these problems, but still suffer from an inability to change the width of the conveyor belt without significant rework or adjustment. Although a narrower belt can be used without major adjustment, prior continuous loop conveyor systems still suffer from belt drift. To alleviate these problems, a belt conveyor system that easily adjusts to accommodate continuous loop belts of varying widths is provided. The system comprises a rigid conveyor frame having at least one pair of generally parallel side walls traversed by one or more support brackets. The support brackets are secured to the conveyor frame. Additionally, one or more belt guides, having at least one surface for guiding a conveyor belt, are secured to the support brackets. The system further comprises one or more belt supports each having a substantially horizontal surface for guiding the conveyor belt, wherein the belt supports are secured to the support brackets.

11 Claims, 4 Drawing Sheets

CONVEYOR APPARATUS AND SYSTEM

TECHNICAL FIELD

The invention relates generally to a belt conveyor system which functions either as a stand alone system or as a conversion from a roller based conveyor or continuous loop conveyor and a kit for performing the conversion.

BACKGROUND OF THE INVENTION

Conveyor systems generally serve to convey items along a predetermined path. Typically, conveyor systems are primarily made up of a rigid frame comprising a pair of parallel side walls, or beams, or side rails, transversely connected by a series of spaced apart support brackets or connector bars. However, the actual means employed to effectuate the conveyance of items varies from roller based systems to continuous loop belt systems.

One typical roller based system uses a plurality of cylindrical rollers mounted between the parallel side walls. The rollers form a conveying surface that operates either passively or may be driven. Roller based conveyor systems work well, but typically suffer from excess noise due to unlubricated or worn bearings. Worn bearings can also cause a roller to roll less easily or not at all, thereby affecting the operability and efficiency of the conveyor system and necessitating repair or replacement. Moreover, stresses placed on individual rollers can, over time, cause their mounting holes to wallow out, thus creating the possibility for a roller to assume a non-parallel orientation with respect to adjacent rollers, which could affect the operability and efficiency of the conveyor system. Finally, due to the tendency for individual rollers or their bearings to wear out and require repair or replacement at varied intervals and because of the effect that individual malfunctioning rollers can have on the roller system as a whole, roller based systems typically suffer from increased and costly downtime for maintenance and repair.

Another typical conveyor system is a continuous loop belt system. Continuous loop belt systems typically use a fabric, rubber, or modular belt tensioned by passive axles and drive axles above, between, or below the conveyor frame. Because many continuous loop belt systems are installed over pre-existing roller systems, the conveying surface of the belt is typically supported by rollers. However, the conveying surface can also be supported by nonmoving wear strips, made or coated with a smooth hard polymer, such as polyethylene, nylon, or the like. Belt systems utilizing rollers for support of the conveying surface suffer from the same drawbacks as typical roller based systems. Additionally, belt systems, whether utilizing rollers or wear strips for conveying surface support, typically suffer from constant realignment of the drive and passive rollers to keep the belt from drifting off of its drive and passive rollers and to keep the belt edges from catching on the side walls of the conveyor frame. To alleviate this problem, the prior art teaches the use of edge guides mounted onto the fixed vertical faces of the conveyor frame or the like. Because the vertical faces of the conveyor frame are typically of a fixed width, the belt must be of a width less than the distance between the edge guides but wide enough to engage the edge guides in a manner to avoid belt drift and belt catching. This type of conveyor system is taught in U.S. Pat. Publication No. 2006/0237292, by Ryan ("Ryan"). Ryan teaches the use of edge guides that are mounted onto vertical walls of a U-shaped pan, which is mounted atop the conveyor frame. While Ryan teaches the use of a width adjustable U-shaped pan, it requires significant adjustment of the U-shaped pan to meet various belt widths. Moreover, if the width of the belt is less than the width of the conveyor frame, the U-shaped pan must be completely repositioned within the conveyor frame, as opposed to being mounted atop the conveyor frame. Although functional, the Ryan approach lacks the ability to quickly and easily change the width of the conveyor belt.

Accordingly, there exists a need for a simple conveyor conversion kit, method and/or apparatus that solves the problems associated with typical roller based and continuous loop based conveyor systems.

SUMMARY

This need and other needs are satisfied by a conveyor belt system embodying features of the present invention. The system comprises a rigid conveyor frame having at least one pair of generally parallel side walls traversed by at least one support bracket. The support bracket is secured to the conveyor frame. Additionally, at least one belt guide having at least one surface for guiding a conveyor belt is secured to at least one support bracket. The system further comprises at least one belt support having at least one substantially horizontal surface for supporting a conveyor belt, wherein at least one belt support is secured to at least one support bracket.

In another preferred embodiment of the present invention, at least one belt guide is removably secured to at least one support bracket, and in another preferred embodiment, at least one belt support is removably secured to at least one support bracket.

Another preferred embodiment of the present invention includes or comprises a return roller secured between at least one pair of generally parallel side walls that is generally parallel to at least one support bracket.

In yet another preferred embodiment of the present invention, each belt guide comprises a lower portion for attachment to the support bracket and an upper portion for contact with the conveyor belt, the upper portion including a generally vertical portion for contacting the edge of the conveyor belt and constraining the conveyor belt against lateral movement.

In another preferred embodiment of the present invention, the conveyor belt system is supplied as a kit for a conversion of an existing roller based or continuous loop conveyor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
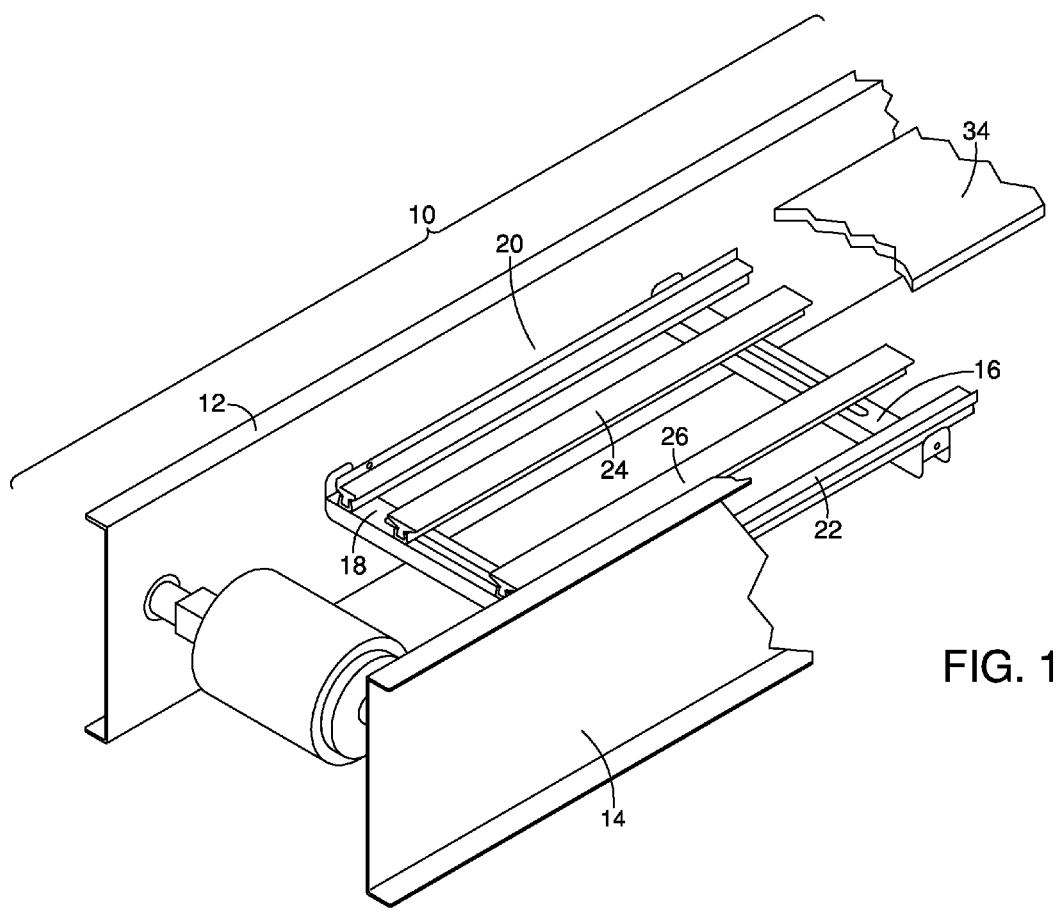
FIG. 1 is an isometric view of a portion of the belt conveyor system.

Refer now to the drawings wherein depicted elements are, for the sake of clarity, not necessarily shown to scale and wherein like or similar elements are designated by the same reference numeral through the several views.

Figure 2:
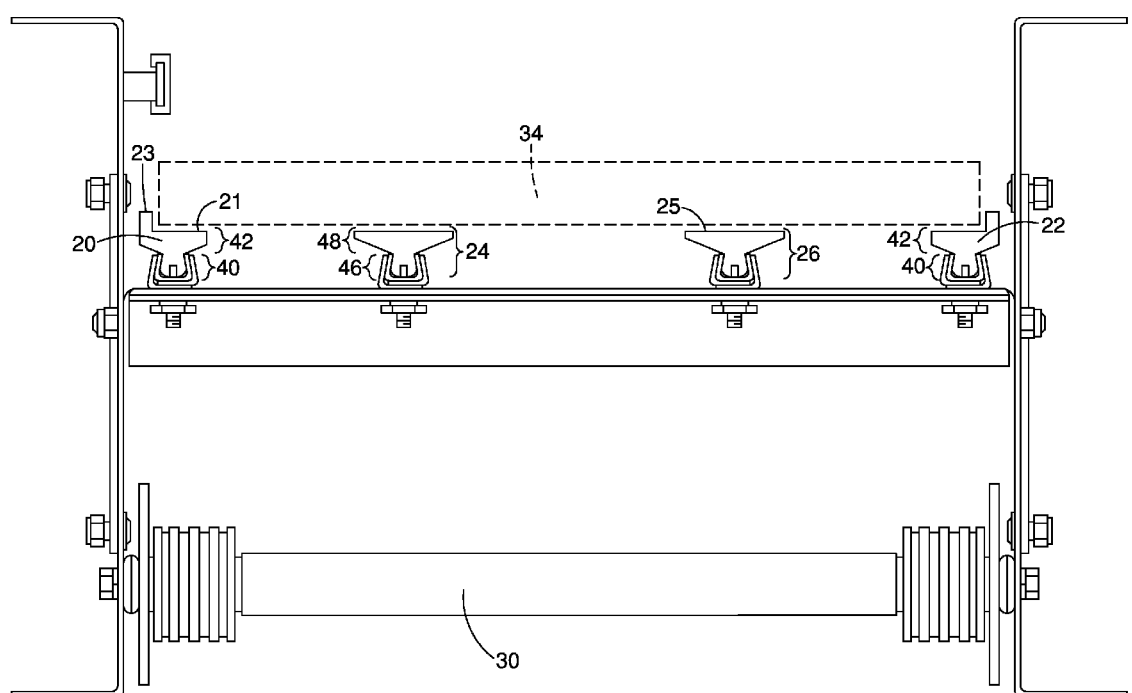
FIG. 2 is a front elevation cross-sectional view of the belt conveyor system.
Figure 3:
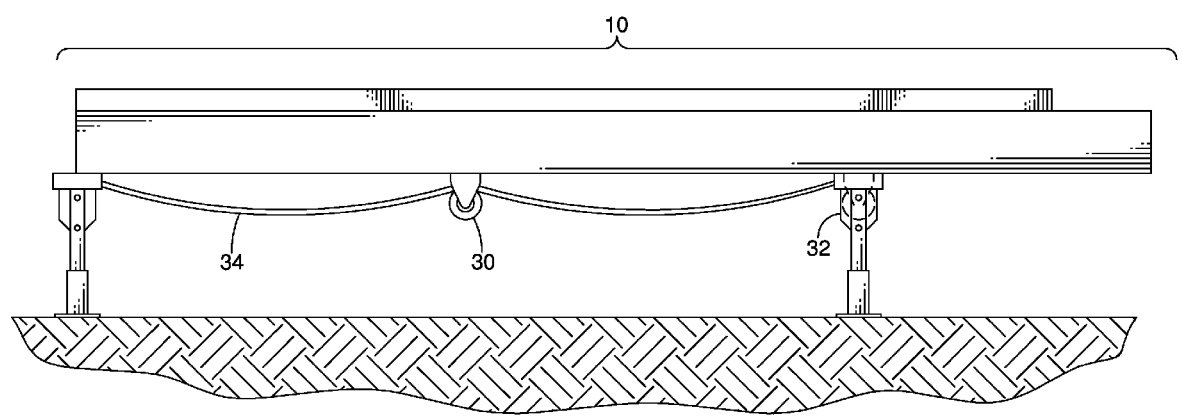
FIG. 3 is a side view of a portion of the belt conveyor system.
Figure 4:
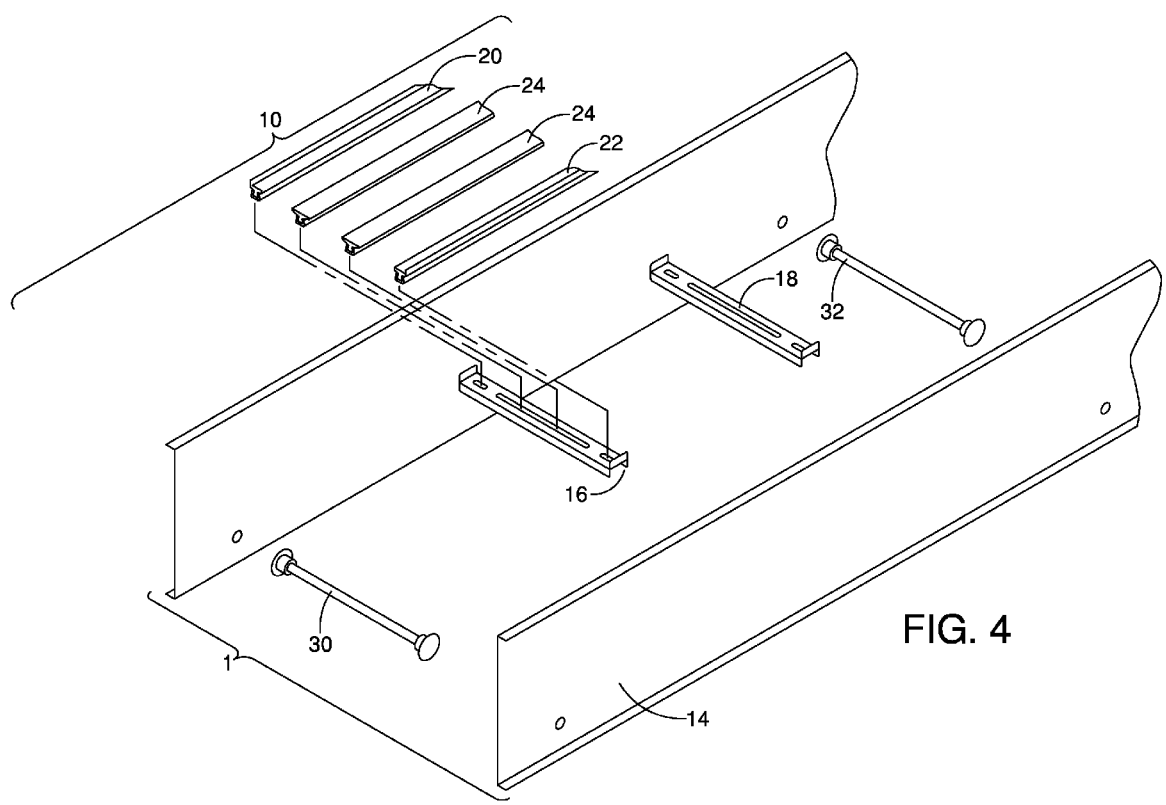
FIG. 4 is a break out isometric view of a portion of the belt conveyor system.

Referring to FIGS. 1-4 of the drawings, a conveyor system in accordance with a preferred embodiment of the present invention is shown. In FIGS. 1 and 4, the reference number 10 generally designates a portion of a typical belt conveyor frame. The frame 10 may be of a type specifically constructed for the conveyor system or may be a pre-existing frame suitable for a conversion. The frame 10 includes at least one pair of generally parallel side walls 12 and 14 traversed by at least one support bracket 16 of approximately eighteen inches in length. The side walls 12 and 14 and support bracket 16 are typically made of steel. Typically multiple support brackets 16 and 18 are secured to the conveyor frame 10. These support brackets 16 and 18 are secured to the side walls 12 and 14 of the conveyor frame 10 in a generally perpendicular fashion.

As seen in FIG. 2, a pair of belt guides 20 and 22 are typically secured to the support brackets 16 and 18. The belt guides 20 and 22 each have a generally vertical surface 23 of approximately two to three inches (also known as a guide surface) that is generally parallel to the side walls 12 and 14 for guiding the edge of the conveyor belt 34 to eliminate lateral movement of the belt 34, which is sometimes referred to as belt drift. Additionally, the belt guides 20 and 22 can have a generally horizontal surface 21 for supporting the outermost region of the conveyor belt 34, although the horizontal surface as part of the belt guides 20 and 22 is not required. The belt guides 20 and 22 depicted in FIG. 2 have an "L" shaped cross-sectional surface orientation, although other orientations are permissible, including concave vertical surfaces. The surfaces 21 and 23 extend lengthwise in a fashion generally parallel to the side walls 12 and 14 and can extend in a manner to form continuous guide surfaces along the length of the conveyor. The belt guides 20 and 22 are removably secured to the support brackets 16 and 18 by screws or bolts. The belt guides 20 and 22 can be mounted at various positions along the support brackets 16 and 18 to accommodate conveyor belts 34 of various widths.

The system further comprises one or more belt supports 24 and 26. Each of the supports 24 and 26 have at least one substantially horizontal surface 25 (also known as a support surface) for supporting a conveyor belt 34. The belt supports 24 and 26 are generally secured to one or more support brackets 16 and 18 by screws or bolts. The belt supports 24 and 26 can be mounted at various positions along the support brackets 16 and 18 to accommodate conveyor belts 34 of various widths, including widths of approximately fifteen inches, and conveyor loads that require additional support at varied locations beneath the load. Each supporting surface 25 of belt supports 24 and 26 extends lengthwise in a fashion generally parallel to the side walls 12 and 14 and can extend in a manner to form continuous support surfaces along the length of the conveyor. The supporting and guiding surfaces 21, 23, and 25 of the belt guides 20 and 22 and the belt supports 24 and 26 are typically made or coated with a polymer, such as polyethylene, nylon, or the like. The supporting and guiding surfaces 21, 23, and 25 of the belt guides 20 and 22 and the belt supports 24 and 26 are also sometimes referred to as wear strips.

As seen in FIGS. 2 and 3, return rollers 30 and 32 are secured between the side walls 12 and 14 of the conveyor frame 10. The return rollers 30 and 32 are generally parallel to the support brackets 16 and 18 and located along a plane below the support brackets 16 and 18. Moreover, the return rollers 30 and 32 are spaced along the length of the conveyor frame 10 in order to support and guide the return path of the conveyor belt 34, which can travel above or below the return rollers 30 and 32.

In FIG. 2, the belt guides 20 and 22 each comprise a lower portion 40 and an upper portion 42. The lower portion 40 attaches to support brackets 16 and 18 by screws or bolts. The lower portion 40 provides a support base for the upper portion 42. The upper portion 42, which contacts with and guides the conveyor belt 34, is removably attached to the lower portion 40 by screws or bolts, although other methods for securing the upper portion, such as adhesive, may also be used. The upper portion 42 generally includes a vertical portion 23 (also known as vertical surface or guide surface) for contacting the edge of the conveyor belt 34 and constraining the conveyor belt 34 against lateral movement. The upper portion 42 can also include a generally horizontal support surface 21 for supporting the edge of the conveyor belt 34. The upper portion 42 is typically made or coated with a polymer, such as polyethylene, nylon, or the like. The benefit of having a removable upper portion 42 is the ability to quickly and easily change out the sizes, shapes, or types of the guide surfaces 23 and support surfaces 21 being used for any number of reasons, including wear of the surfaces 21 and 23.

As can also be seen in FIG. 2, the belt supports 24 and 26 each comprise a lower portion 46 and an upper portion 48. The lower portion 46 attaches to support brackets 16 and 18 by screws or bolts, although other methods for securing the lower portion, such as clamps, may also be used. The lower portion 46 provides a support base for the upper portion 48. The upper portion 48, which contacts with and supports the conveyor belt 34, is removably attached to the lower portion 46 by screws or bolts, although other methods for securing the upper portion, such as adhesive, may also be used. The upper portion 48 generally includes a substantially horizontal support surface 25 for supporting the conveyor belt 34. The upper portion 48 is typically made or coated with a polymer, such as polyethylene, nylon, or the like. The benefit of having a removable upper portion 48 is the ability to quickly and easily change out the sizes, shapes, or types of the support surfaces 25 being used for any number of reasons, including wear of the surfaces 25.

Accordingly, a kit that may be used for converting an existing roller based or continuous loop conveyor system having a rigid frame 10, with at least one pair of generally parallel side walls 12 and 14, includes a plurality of support brackets 16 and 18; a plurality of belt guides 20 and 22; a plurality of belt supports 24 and 26; and fasteners to secure the support brackets 16 and 18, the belt guides 20 and 22, and the belt supports 24 and 26 in accordance with the preferred embodiment. Several simple steps are all that is necessary to convert a preexisting roller based or continuous loop conveyor system into the conveyor system of the present invention. First, substantially all of the rollers or wear strips originally located between the generally parallel side walls 12 and 14 are removed. Then at least one support bracket 16 is fastened transversely to the side walls 12 and 14, although typically more than one support bracket is used. Next, at least two belt guides 20 and 22 and at least one belt support 24 are mounted to at least one support bracket 16 in a manner for guiding and supporting a conveyor belt 34. The kit may also include at least two return rollers 30 and 32 that are mounted along the length of and below the conveyor frame 10 in order to support and guide the return path of the conveyor belt 34, which can travel above or below the return rollers 30 and 32.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

We claim:

1. A conveyor belt system, comprising:
  a rigid conveyor frame having at least one pair of generally parallel side walls traversed by at least one support bracket, wherein said support bracket is secured to said conveyor frame;
  at least one belt guide having at least one surface for guiding a conveyor belt, said at least one belt guide including:
    a lower portion for attachment to the support bracket; and
    an upper portion for contact with the conveyor belt, the upper portion including a generally vertical portion for contacting the edge of the conveyor belt and constraining the conveyor belt against lateral movement, and a generally horizontal support surface for supporting the conveyor belt; and
  at least one belt support having at least one substantially horizontal surface for supporting a conveyor belt, wherein said at least one belt support is removably secured to said at least one support bracket.

2. The conveyor belt system of claim 1, wherein said at least one belt guide is removably secured to said at least one support bracket.

3. The conveyor belt system of claim 1, further comprising a return roller secured between said at least one pair of generally parallel side walls that is generally parallel to said at least one support bracket.

4. A kit for converting an existing roller based or continuous loop conveyor system having a rigid frame with at least one pair of generally parallel side walls, the conversion system comprising:
  a plurality of support brackets, each support bracket secured to and traversing between the side walls;
  a plurality of belt guides, each belt guide having at least one guide surface that tracks at least one edge of the belt, the belt guides including:
    a lower portion for attachment to the support bracket; and
    an upper portion for contact with the conveyor belt, the upper portion including a generally vertical portion for contacting the edge of the conveyor belt and constraining the conveyor belt against lateral movement, and a generally horizontal support surface for supporting the conveyor belt; and
  a plurality of belt supports, each belt support removably secured to at least one support bracket, and each belt support having a support surface that provides support to one side of the belt.

5. The conveyor system conversion kit of claim 4, wherein each belt guide is removably secured to said at least one support bracket.

6. The conveyor conversion system kit of claim 4, further comprising a return roller secured between said at least one pair of generally parallel side walls that is generally parallel to said at least one support bracket.

7. The conveyor conversion kit of claim 4, each belt guide having an "L" shaped cross-sectional surface orientation.

8. The conveyor conversion system kit of claim 4, wherein each support bracket is dimensioned to replace at least one roller extending between the side walls.

9. A conveyor belt system, comprising:
  a rigid conveyor frame having at least one pair of generally parallel side walls;
  at least one support bracket secured to and extending transversely between the side walls of the conveyor frame;
  a pair of belt guides secured to each support bracket, each belt guide having a guide surface arranged to contact an edge of the conveyor belt, each belt guide having an "L" shaped cross-sectional surface orientation, each belt guide including:
    a lower portion for attachment to the support bracket; and
    an upper portion for contact with the conveyor belt, the upper portion including a generally vertical portion for contacting the edge of the conveyor belt and constraining the conveyor belt against lateral movement, and a generally horizontal support surface for supporting the conveyor belt; and
  at least one belt support removably secured to each support bracket, the belt support having at least one substantially horizontal surface for supporting the conveyor belt.

10. The conveyor belt system of claim 9, wherein the belt guide is removably secured to said at least one support bracket.

11. The conveyor belt system of claim 9, further comprising a return roller secured between said at least one pair of generally parallel side walls that is generally parallel to said at least one support bracket.

* * * * *